No. 702,087. Patented June 10, 1902.
G. BRABROOK.
INSULATING HANDLE CONNECTION.
(Application filed Sept. 12, 1901.)
(No Model.)

Witnesses
Inventor
George Brabrook
by
Attorneys

UNITED STATES PATENT OFFICE.

GEORGE BRABROOK, OF TAUNTON, MASSACHUSETTS, ASSIGNOR TO REED AND BARTON CORPORATION, OF TAUNTON, MASSACHUSETTS.

INSULATING HANDLE CONNECTION.

SPECIFICATION forming part of Letters Patent No. 702,087, dated June 10, 1902.

Application filed September 12, 1901. Serial No. 75,172. (No model.)

*To all whom it may concern:*

Be it known that I, GEORGE BRABROOK, a citizen of the United States, residing at Taunton, in the county of Bristol and State of Massachusetts, have invented certain new and useful Improvements in Insulating Handle Connections; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to insulating handle connections for vessels designed to contain hot liquids; and the objects of the same are to provide a simple and durable connection between the handle and the vessel and one which may be easily and quickly assembled and attached and which will not conduct the heat from the vessel to the handle. I attain these objects by means of the construction shown in the accompanying drawings, in which—

Figure 1:
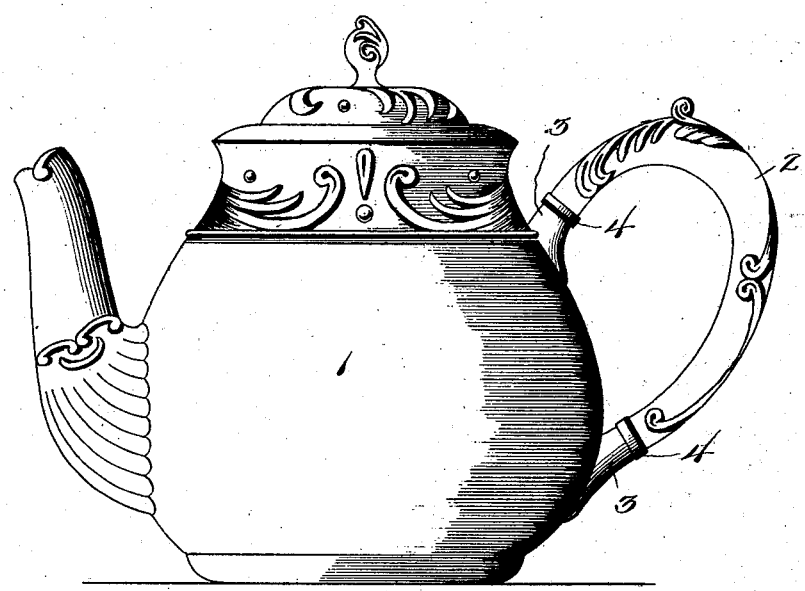
Figure 2:
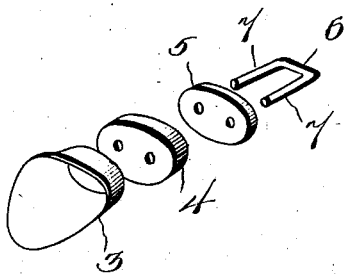
Figure 3:
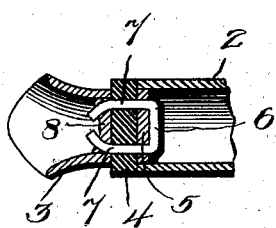

Figure 1 is a side elevation of a teapot or similar vessel. Fig. 2 is a perspective view of the various parts which form the insulating handle connection before they are assembled. Fig. 3 is a longitudinal section taken through the handle connection after the parts have been assembled and showing a portion of the hollow handle secured thereto.

In said drawings the numeral 1 designates a vessel designed for containing hot liquids, as a teapot, and 2 is the handle thereof, said handle being preferably hollow. The terminal ends of the handle 2 are secured to an insulating connection made up of the parts shown in Fig. 2. These parts comprise the fitting 3, of the required shape at one end to fit the side of the vessel 1, to which it may be secured by soldering or otherwise. A disk or piece of insulating material 4, made of vulcanite, ivory, or other suitable non-conducting material, is interposed between the fitting 3 and the handle 2. A plate or disk 5, of any suitable metal or material, is secured upon one side of the insulating-piece 4 by means of a staple 6, the legs 7 of said staple being passed through the plate 5 and through the insulating-piece 4, the terminal ends of the legs 7 extending beyond the insulating-piece 4. After the piece 4 and the plate 5 have been secured together by the staple 6 the ends of the legs 7 may be bent, as shown in Fig. 3, and the fitting 3 may be connected to the insulating-piece by a small quantity of solder or molten metal 8, Fig. 3, poured into the fitting 3 to surround the legs 7 of the staple. The fitting 3 is then secured to the vessel 1, and the handle 2 is attached to the plate 5 in any suitable manner.

From the foregoing it will be obvious that my insulating handle connection may be quickly assembled at slight cost and that a durable and efficient device is produced without the necessity of screw-threading any of the parts.

It will be obvious that the fastener (the staple) is entirely concealed from view and that it is located entirely within the opening of the hollow handle. This is of twofold advantage in that there is no projecting part—such as a screw-head, a binding-pin, &c.—to mar the appearance of the handle, nor is there a requirement of the forming of openings in the surface of the handle, which would tend to weaken the structure at a point where the greatest strain is present. Furthermore, the staple being firmly "set" by the molten metal at one end and the head at the other end there is no possibility of the staple working loose, and thus destroying the handle connection. Where a screw or its equivalent is used, there is a constant tendency of the same working loose from its nut under the handling of the pot, even though concealed, (an expensive and difficult mode of connecting the handle,) while if the head is exposed the liability is increased by reason of an accidental movement being given during use. Where a transverse pin is used to secure a bar in position, it must extend through the handle and can readily be removed, while its appearance prevents a perfect plating of the handle.

Instead of the staple 6 I may use any suitable metallic fastener having legs or prongs designed to be bent to hold the parts together.

Having thus fully described my invention, what I claim is—

1. A handle connection comprising a tubular fitting, designed to be secured to a vessel, a non-conducting piece, a plate, and a staple, the legs of the staple extending through the plate and insulating-piece and secured within the tubular fitting by molten metal, substantially as described.

2. A handle connection consisting of an insulator, a plate, a tubular fitting and a staple, the legs of the staple being passed through the plate and the insulator and the terminal ends of said legs being clenched within the tubular fitting and secured in place by molten metal, the fitting secured to a vessel and a handle secured to the plate, substantially as described.

In testimony whereof I affix my signature in presence of two witnesses.

GEORGE BRABROOK.

Witnesses:
W. B. GRANFIELD,
JOHN A. ABBOTT.